United States Patent
Fujii (10) Patent No.: US 8,975,786 B2
(45) Date of Patent: Mar. 10, 2015

(54) PORTABLE ELECTRONIC EQUIPMENT AND METHOD OF CONTROLLING THE SAME

(75) Inventor: Nobuyuki Fujii, Osaka (JP)

(73) Assignee: Sharp Kabushiki Kaisha, Osaka (JP)

( * ) Notice: Subject to any disclaimer, the term of this patent is extended or adjusted under 35 U.S.C. 154(b) by 896 days.

(21) Appl. No.: 13/112,445

(22) Filed: May 20, 2011

(65) Prior Publication Data

US 2012/0133218 A1 May 31, 2012

(30) Foreign Application Priority Data

May 21, 2010 (JP) ................................. 2010-117244

(51) Int. Cl.
*H01H 35/00* (2006.01)
*H04M 1/725* (2006.01)

(52) U.S. Cl.
CPC ...... *H04M 1/72569* (2013.01); *H04M 2250/12* (2013.01)
USPC .......................................... 307/116; 307/121

(58) Field of Classification Search
CPC ........... H02J 7/00; H01H 35/00; H01H 83/00; H01H 35/14
USPC ................................................ 307/121, 116
See application file for complete search history.

(56) References Cited

U.S. PATENT DOCUMENTS

| | | | | |
|---|---|---|---|---|
| 5,790,046 | A * | 8/1998 | Blossfeld | 340/3.4 |
| 6,977,688 | B2 * | 12/2005 | Hanada et al. | 348/372 |
| 8,255,006 | B1 * | 8/2012 | Chavez et al. | 455/567 |
| 2011/0096482 | A1 * | 4/2011 | Yano | 361/679.01 |
| 2011/0109170 | A1 * | 5/2011 | Chen et al. | 307/121 |

FOREIGN PATENT DOCUMENTS

| | | |
|---|---|---|
| JP | 11-184576 A | 7/1999 |
| JP | 2008-10126 A | 1/2008 |
| JP | 2008-42495 A | 2/2008 |
| JP | 2009-290504 A | 12/2009 |

* cited by examiner

*Primary Examiner* — Rexford Barnie
*Assistant Examiner* — Joseph Inge
(74) *Attorney, Agent, or Firm* — Birch, Stewart, Kolasch & Birch, LLP (57) ABSTRACT

When portable electronic equipment drops, CPU stops power supply to a prescribed unit. A prescribed unit is a unit that is not necessary for the continuous operation of the portable electronic equipment. When the portable electronic equipment collides with the floor or the ground, the battery terminal may be momentarily detached from the connector. In this case, instantaneous voltage drop or momentary power failure may occur. Power supply to a prescribed unit is stopped while power supply to CPU and RAM is continued. Therefore, power supply to CPU and RAM can be continued with electric charge stored in a capacitor inside the portable electronic equipment.

14 Claims, 8 Drawing Sheets

PORTABLE ELECTRONIC EQUIPMENT AND METHOD OF CONTROLLING THE SAME

This nonprovisional application is based on Japanese Patent Application No. 2010-117244 filed on May 21, 2010 with the Japan Patent Office, the entire contents of which are hereby incorporated by reference.

BACKGROUND OF THE INVENTION

1. Field of the Invention

The present invention relates to portable electronic equipment driven by a battery and a method of controlling the same.

2. Description of the Background Art

Portable electronic equipment having a protective function against impact from dropping or vibration is proposed. For example, Japanese Patent Laying-Open No. 2008-10126 discloses an image pickup apparatus with the aim of performing a proper protective function. The image pickup apparatus includes an acceleration detection sensor for detecting a level of its drop or shake. The image pickup apparatus further includes determination means for determining an output signal from the acceleration detection sensor and protection control means for stopping a recording operation of a recording medium in accordance with a determination result from the determination means. The image pickup apparatus further includes operation control means. The operation control means controls the operation of the determination means or the protection control means by setting a plurality of detection levels in the acceleration detection sensor depending on an image pickup mode or a power supply mode.

In general, portable electronic equipment is equipped with a battery as a power supply. When portable electronic equipment is dropped and subjected to impact, the battery may be moved inside the equipment to cause the battery terminal (positive electrode, negative electrode) to be momentarily detached from the connector terminal.

If the battery terminal is detached from the connector terminal even for a brief moment, instantaneous voltage drop or momentary power failure occurs. Electronic equipment is usually provided with a capacitor for preventing fluctuations of power supply voltage. However, when instantaneous voltage drop or momentary power failure occurs, electricity required for the entire operation of the equipment cannot be compensated for only with electric charge stored in the capacitor. Therefore, normal operation of portable electronic equipment may not be continued when instantaneous voltage drop or momentary power failure occurs.

In order to avoid such a problem, a sub-power supply such as an electric double layer capacitor may be provided in addition to a battery serving as a main power supply. However, a large capacity (for example, a few F) is required to make up for a drop of power supply voltage in the entire portable electronic equipment with the electric double layer capacitor. On the other hand, portable electronic equipment essentially has a limited mounting space. Therefore, there are many restrictions in mounting such a large-capacity capacitor on portable electronic equipment.

The foregoing Japanese Patent Laying-Open No. 2008-10126 discloses a technique for protecting HDD (Hard Disk Drive), which is sensitive to impact, from impact of dropping. However, Japanese Patent Laying-Open No. 2008-10126 does not show the problem of momentary detachment of the battery terminal from the connector due to impact of dropping and thus does not suggest a method for protecting electronic equipment from the instantaneous voltage drop or momentary power failure as described above.

On the other hand, in order to prevent the battery terminal from being disengaged from the connector terminal, there is a possibility of a structural solution such as a structure for fixing the battery or a structure for softening impact on the battery. However, this may lead to a complicated structure of portable electronic equipment or a cost increase.

An object of the present invention is to solve the above-noted problem and to provide a technique for protecting portable electronic equipment from instantaneous voltage drop or momentary power failure caused by impact from dropping.

SUMMARY OF THE INVENTION

In accordance with an aspect of the present invention, portable electronic equipment driven by a battery includes: a connector connected to the battery; a plurality of functional units operating with power supplied from the battery through the connector; a control unit for controlling the plurality of functional units with power supplied from the battery through the connector; a detection unit for detecting dropping of the portable electronic equipment; and a switching unit. The switching unit is provided for at least one unit that does not require constant power feed, among the plurality of functional units, and switches whether to electrically connect the at least one unit to the battery. When dropping of the portable electronic equipment is detected by the detection unit, the switching unit cuts off electrical connection between the at least one unit and the battery.

Preferably, the plurality of functional units include a volatile memory for storing data for an operation of the control unit. The at least one unit is included in units of the plurality of functional units excluding the volatile memory.

Preferably, after electrical connection between the at least one unit and the battery is cut off, the switching unit recovers electrical connection between the at least one unit and the battery when a prescribed recovery condition is satisfied.

Preferably, the detection unit is configured to detect an end of dropping of the portable electronic equipment. The prescribed recovery condition is a condition that a prescribed time has elapsed since an end of dropping of the portable electronic equipment is detected by the detection unit.

Preferably, the control unit controls the switching unit based on an output from the detection unit.

Preferably, the detection unit outputs a value corresponding to an acceleration exerted on the portable electronic equipment. The control unit includes a storage unit for storing first and second threshold values to be compared with an output value from the detection unit, a counting unit for starting counting time from a time when an absolute value of an output value from the detection unit exceeds an absolute value of the second threshold value, and a switching control unit for controlling the switching unit. An absolute value of the second threshold value is greater than an absolute value of the first threshold value. If an absolute value of an output value from the detection unit is greater than an absolute value of the first threshold value and is smaller than an absolute value of the second threshold value, the switching control unit controls the switching unit such that electrical connection between the at least one unit and the battery is cut off. And then, when a counted time from the counting unit reaches the prescribed time, the switching control unit recovers electrical connection between the at least one unit and the battery.

Preferably, the portable electronic equipment further includes an input unit for accepting an instruction by a user.

The prescribed recovery condition is a condition that an instruction to resume an operation of the at least one unit is input to the input unit.

In accordance with another aspect of the present invention, a method of controlling portable electronic equipment driven by a battery is provided. The portable electronic equipment includes a connector connected to the battery, a plurality of functional units operating with power supplied from the battery through the connector, a control unit for controlling the plurality of functional units with power supplied from the battery through the connector, a detection unit for detecting dropping of the portable electronic equipment, and a switching unit provided for at least one unit that does not require constant power feed, among the plurality of functional units, for switching whether to electrically connect the at least one unit to the battery. The method includes the steps of determining whether dropping of the portable electronic equipment is detected, based on an output value from the detection unit; and cutting off electrical connection between the at least one unit and the battery, using the switching unit, when it is determined that dropping of the portable electronic equipment is detected.

Preferably, the plurality of functional units include a volatile memory for storing data for an operation of the control unit. The at least one unit is included in units of the plurality of functional units excluding the volatile memory.

Preferably, the method further includes the steps of: determining whether a prescribed recovery condition is satisfied; and recovering electrical connection between the at least one unit and the battery, using the switching unit, if it is determined that the prescribed recovery condition is satisfied.

Preferably, the detection unit is configured to detect an end of dropping of the portable electronic equipment. The prescribed recovery condition is a condition that a prescribed time has elapsed since an end of dropping of the portable electronic equipment is detected by the detection unit.

Preferably, the detection unit outputs a value corresponding to an acceleration exerted on the portable electronic equipment. The method further includes the steps of: preparing first and second threshold values to be compared with an output value from the detection unit; and counting time from a time when an absolute value of an output value from the detection unit exceeds an absolute value of the second threshold value. An absolute value of the second threshold value is greater than an absolute value of the first threshold value. The step of cutting off includes the step of controlling the switching unit such that electrical connection between the at least one unit and the battery is cut off, if an absolute value of an output value from the detection unit is greater than an absolute value of the first threshold value and is smaller than an absolute value of the second threshold value. The step of recovering includes the step of recovering electrical connection between the at least one unit and the battery, when a time counted by the step of counting reaches the prescribed time.

Preferably, the portable electronic equipment further includes an input unit for accepting an instruction by a user. The prescribed recovery condition is a condition that an instruction to resume an operation of the at least one unit is input to the input unit.

In accordance with the present invention, the operation of portable electronic equipment can be maintained even when instantaneous voltage drop or momentary power failure is caused by impact exerted on the portable electronic equipment. Therefore, in accordance with the present invention, the portable electronic equipment can be protected from instantaneous voltage drop or momentary power failure caused by impact from dropping.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

In the following, an embodiment of the present invention will be described in detail with reference to the drawings. It is noted that in the figures the same or corresponding parts are denoted with the same reference numerals and a description thereof will not be repeated.

Figure 1:
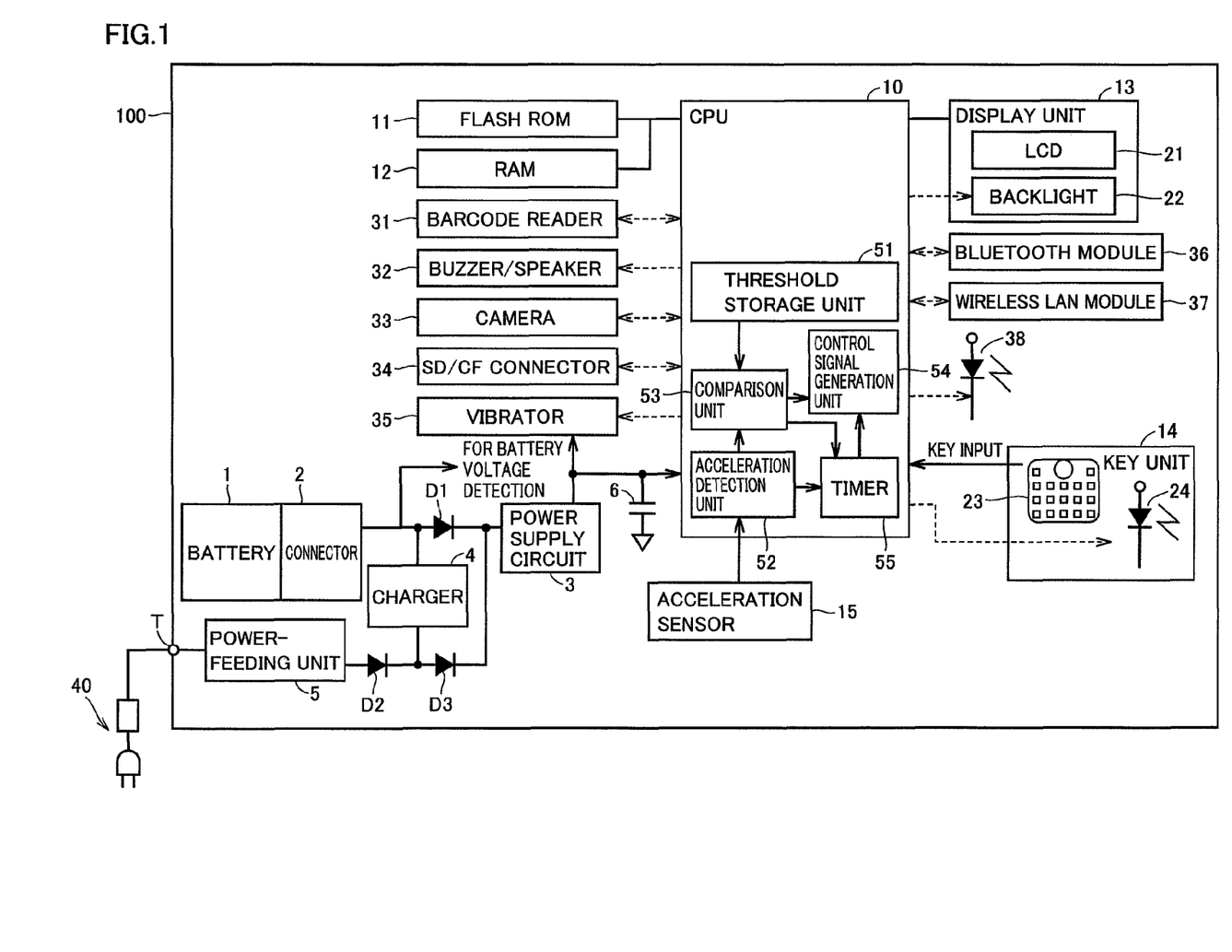
FIG. 1 is a functional block diagram schematically showing a configuration of portable electronic equipment in accordance with an embodiment of the present invention.

FIG. 1 is a functional block diagram schematically showing a configuration of portable electronic equipment in accordance with an embodiment of the present invention. The portable electronic equipment in accordance with this embodiment is a professional-use portable terminal (handy terminal) mainly used for managing commodities, for example, in the field of distribution/transportation.

Referring to FIG. 1, portable electronic equipment 100 includes a CPU (Central Processing Unit) 10, a flash ROM (Read Only Memory) 11, a RAM (Random Access Memory) 12, a display unit 13, a key unit 14, and an acceleration sensor 15.

CPU 10 centrally controls the entire operation of portable electronic equipment 100 by controlling operations of a variety of functional units described later.

Flash ROM 11 is a storage device in which information is held in a nonvolatile manner and the information can be overwritten. Information sent from CPU 10 is stored in flash ROM 11. This information is, for example, information concerning the settings of operations of portable electronic equipment 100. Whenever CPU 10 is started, CPU 10 reads out the information from flash ROM 11.

RAM 12 is a volatile memory capable of holding information while power supply voltage is being supplied. CPU 10 performs data read and write from/into RAM 12.

Display unit 13 is controlled by CPU 10 to display a variety of information. Display unit 13 includes an LCD (Liquid Crystal Display) panel 21 and a backlight 22.

Key unit 14 includes keys 23 operated by the user and an LED (Light Emitting Diode) 24 for illuminating keys. Keys 23 are an input unit accepting an instruction from the user. CPU 10 controls operations of a variety of functional units based on an instruction (key input) input from keys 23 through the user's key operation.

Acceleration sensor 15 detects an acceleration exerted on portable electronic equipment 100 and outputs a value indicating the acceleration to CPU 10. In the present embodiment, it is assumed that acceleration sensor 15 outputs the detected acceleration as an analog value (in other words, outputs as analog voltage). However, acceleration sensor 15 may digitally output the detected acceleration.

Portable electronic equipment 100 further includes a barcode reader 31, a buzzer/speaker unit 32, a camera 33, an SD/CF connector 34, a vibrator 35, a Bluetooth® module 36, a wireless LAN (Local Area Network) module 37, and an indicator LED 38. These units are equivalent to the functional units controlled by CPU 10.

Barcode reader 31 scans digital information represented by a barcode and transmits the digital information to CPU 10. Although not shown, barcode reader 31 includes a light source for applying light to a barcode and a scanner for scanning a barcode.

Buzzer/speaker unit 32 is controlled by CPU 10 to output a sound to the outside. Camera 33 captures an image and sends data of the image to CPU 10. SD/CF connector 34 is connected to a terminal of an SD card or a CF (Compact Flash®) card. CPU 10 reads out information from the memory card (SD card or CF card) connected to connector 34 or writes information into the memory card. Vibrator 35 vibrates portable electronic equipment 100 under the control of CPU 10. Bluetooth® module 36 and wireless LAN module 37 are modules for wireless communications. Indicator LED 38 illuminates to notify the user of the operational state of portable electronic equipment 100.

Portable electronic equipment 100 further includes a battery 1, a connector 2, a power supply circuit 3, a charger 4, a power-feeding unit 5, a capacitor 6, and diodes D1-D3. Battery 1 is connected to connector 2 to supply power to the above-noted units including CPU 10. Thus, a variety of units including CPU 10 are operated. The kind of battery 1 is not specifically limited and may be a secondary battery such as a lithium-ion battery or a primary battery such as an alkaline battery.

Power supply circuit 3 supplies power supplied from battery 1 through connector 2 to CPU 10 and a variety of functional units as described above. If there is a unit with a different power supply voltage, power supply circuit 3 includes a voltage converter circuit (DC/DC converter) for converting the voltage of battery 1 into the power supply voltage of the unit. If battery 1 is a secondary batter, charger 4 supplies power supplied from the outside through power-feeding unit 5 to battery 1. Power-feeding unit 5 is connected to an AC adapter 40 to receive power from the outside of portable electronic equipment 100. AC adapter 40 is connected to a not-shown outlet and is removably attached to a terminal T. AC adapter 40 converts AC power supplied form a commercial power source into DC power and supplies the DC power to power-feeding unit 5.

Diode D1 passes current in the direction from battery 1 to power supply circuit 3 and blocks current flow in the reverse direction. Diodes D2, D3 pass current in the direction from power-feeding unit 5 to power supply circuit 3 and block current flow in the reverse direction. Furthermore, diode D2 passes current in the direction from power-feeding unit 5 to power supply circuit 3 and blocks current flow in the reverse direction. Therefore, power from battery 1 is supplied to a variety of units through power supply circuit 3. On the other hand, power from power-feeding unit 5 is sent to charger 4 to charge battery 1 and is also supplied to a variety of units through power supply circuit 3.

CPU 10 includes a threshold storage unit 51, an acceleration detection unit 52, a comparison unit 53, a control signal generation unit 54, and a timer 55. Threshold storage unit 51 stores a first threshold value and a second threshold value as threshold values of acceleration detected by acceleration sensor 15. The absolute value of the second threshold value is set larger than the absolute value of the first threshold value.

The first and second threshold values are stored beforehand, for example, in flash ROM 11. When CPU 10 is started, CPU 10 reads out the first and second threshold values from flash ROM 11. The first and second threshold values read out from flash ROM 11 are stored in threshold storage unit 51.

Acceleration detection unit 52 detects a value of acceleration based on a signal output from acceleration sensor 15. When analog voltage is output from acceleration sensor 15, acceleration detection unit 52 performs analog-to-digital conversion of the analog voltage to detect the value of acceleration. Comparison unit 53 compares the value of acceleration detected by acceleration detection unit 52 with the first threshold value or the second threshold value stored in threshold storage unit 51 and outputs the comparison result.

Control signal generation unit 54 outputs a control signal for switching between power supply to a prescribed unit and power supply stop, based on the comparison result from comparison unit 53 and the counted value from timer 55. In FIG. 1, the control signal sent from CPU 10 to a prescribed unit for power supply and power supply stop is indicated by a broken arrow.

Timer 55 starts counting time based on the comparison result from comparison unit 53. The counted value from timer 55 is sent to control signal generation unit 54.

An operation of portable electronic equipment 100 will now be described. When portable electronic equipment 100 drops, a value of acceleration above the absolute value of the first threshold value is detected by acceleration sensor 15 and CPU 10. In this case, CPU 10 stops power supply to a prescribed unit.

A prescribed unit is a unit that is not necessary for the continuous operation of portable electronic equipment 100, in other words, a unit that does not require constant power feed. Specifically, CPU 10 stops power supply to barcode reader 31, buzzer/speaker unit 32, camera 33, SD/CF connector 34, vibrator 35, Bluetooth® module 36, and wireless LAN module 37. CPU 10 further stops power supply to, in addition to the above-noted units, backlight 22 of display unit 13, LED 24 of key unit 14, and indicator LED 38. Stopping power supply to prescribed units described above can reduce power consumption of portable electronic equipment 100. In particular, power supply is stopped for such a unit as a light (including LED) that consumes relatively large power (larger as compared with CPU 10) and does not require constant power feed, so that power consumption of portable electronic equipment 100 can be significantly reduced.

When portable electronic equipment 100 collides with the floor, ground, etc., the terminal of battery 1 may be momentarily detached from connector 2. In this case, instantaneous voltage drop or momentary power failure possibly occurs. In the present embodiment, power supply to the above-noted prescribed units is stopped when portable electronic equipment 100 drops, thereby reducing power consumption of portable electronic equipment 100.

Even when instantaneous voltage drop occurs, the operations of CPU 10 and RAM 12 can be maintained with electric charge stored in the capacitor (in FIG. 1, only capacitor 6 is representatively shown as a capacitor connected to power supply circuit 3) inside portable electronic equipment 100. As being mounted on portable electronic equipment, power consumption of CPU 10 and RAM 12 is very small. The time during which the terminal of battery 1 is detached from connector 2 due to impact from dropping is only a brief moment (for example, one millisecond or shorter, depending on situations). On the other hand, the capacity of capacitors (for example, chip capacitors) is increased, for example, to a few to a few tens of µF (in the case of functional polymer capacitors, a few hundreds of µF). By connecting several such capacitors in parallel with power supply circuit 3, the operations of CPU 10 and RAM 12 can be maintained, if it is the case with momentary power failure. Therefore, by stopping power supply to the above-noted prescribed units, the operations of CPU 10 and RAM 12 can be maintained using electric charge stored in the capacitor, during instantaneous voltage drop or momentary power failure.

When portable electronic equipment 100 collides with the floor, ground, etc., an acceleration above the absolute value of the second threshold value is detected by acceleration sensor 15 and CPU 10. CPU 10 starts counting time at the time when an acceleration above the absolute value of the second threshold value is detected. When a prescribed time has elapsed since the start of counting time, CPU 10 restores power supply to the above-noted prescribed units. The prescribed time is set longer than a time taken for the power supply voltage to recover. Accordingly, a variety of units that temporarily stop can be operated again.

In the present embodiment, when dropping of portable electronic equipment 100 is detected, power supply to backlight 22 of display unit 13 is stopped, whereas power supply to LCD panel 21 is continued. Accordingly, display of information by LCD panel 21 can be continued. Therefore, the user can easily determine whether portable electronic equipment 100 operates normally or abnormality occurs (that is, portable electronic equipment 100 does not operate normally) after portable electronic equipment 100 collides with the floor, ground, etc.

Figure 2:
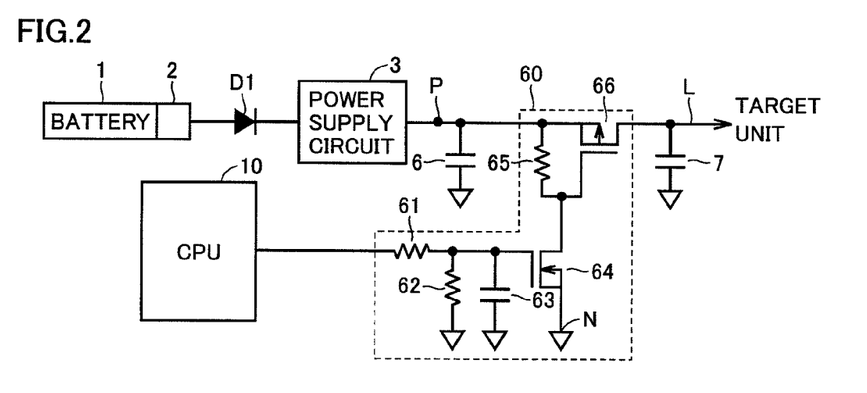
FIG. 2 is a diagram showing an exemplary configuration of a switching unit for switching between power supply and stop of supply to a prescribed unit of a plurality of units shown in FIG. 1.

Power supply and stop of supply to the above-noted prescribed units are executed by a switching unit controlled by CPU 10. FIG. 2 is a diagram showing an exemplary configuration of the switching unit for switching between power supply and stop of supply to a prescribed unit among a plurality of units shown in FIG. 1.

Referring to FIG. 2, a switching unit 60 switches whether to electrically connect a target unit with battery 1 in response to a control signal from CPU 10. Specifically, switching unit 60 includes resistor elements 61, 62, 65, a capacitor 63, an N-channel MOS (Metal Oxide Semiconductor) 64, and a P-channel MOS transistor 66.

Resistor element 61 is connected between CPU 10 and the gate electrode of N-channel MOS transistor 64. Resistor element 62 and capacitor 63 are connected in parallel with the gate electrode of N-channel MOS transistor 64. P-channel MOS transistor 66 is inserted into a power supply line L. Furthermore, resistor element 65 and N-channel MOS transistor 64 are connected in series between power supply line L and a reference voltage node N. Capacitor 6 and capacitor 7 are connected to power supply line L.

When a control signal at an H (logic high) level is output from CPU 10, N-channel MOS transistor 64 and P-channel MOS transistor 66 both turn on. As a result of the turning-on of P-channel MOS transistor 66, power supplied from battery 1 through connector 2, diode D1, and power supply circuit 3 is transmitted through power supply line L to the target unit. On the other hand, when a control signal at an L (logic low) level is output from CPU 10, N-channel MOS transistor 64 and P-channel MOS transistor 66 both turn on. As a result of the turning-on of P-channel MOS transistor 66, power supply to the target unit is cut off.

Although FIG. 2 shows an example of switching unit 60 configured as a discrete component, switching unit 60 may be configured as an integrated circuit such as a switch IC (Integrated Circuit). Furthermore, although switching unit 60 is provided for each target unit in the present embodiment, switching unit 60 may be shared between a plurality of target units.

As shown in FIG. 2, at least one capacitor (capacitors 6, 7) is connected to power supply line L. Even when the terminal of battery 1 is momentarily detached from the terminal of connector 2, the operations of CPU 10 and RAM 12 can be continued using electric charge stored in the capacitor.

Figure 3:
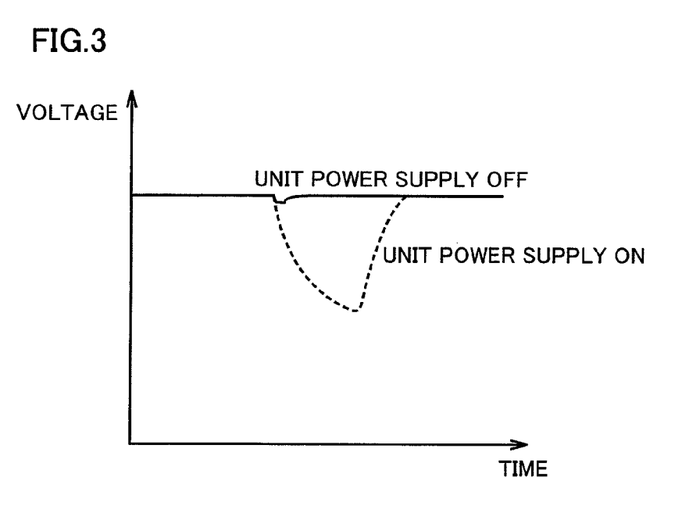
FIG. 3 is a waveform diagram schematically showing a voltage change at a point P shown in FIG. 2 at a time when the portable electronic equipment drops in accordance with the embodiment of the invention.

FIG. 3 is a waveform diagram schematically showing a voltage change at a point P shown in FIG. 2 at a time when the portable electronic equipment drops in accordance with the embodiment of the present invention. Referring to FIG. 2 and FIG. 3, in a state in which the power of the unit is kept on, when the terminal of battery 1 is detached from connector 2 due to impact from dropping, voltage at point P significantly decreases. However, the unit consuming large power is powered off (power supply is stopped), so that a voltage drop at point P can be prevented because of electric charge stored in the capacitor such as capacitors 6, 7 even when the terminal of battery 1 is detached from connector 2 due to impact from dropping. Therefore, the operations of CPU 10 and RAM 12 can be continued.

As a way to prevent instantaneous voltage drop or momentary power failure as described above, the mounting space of the battery may be reduced such that the battery is not moved. However, in the case of a secondary battery (for example, a lithium-ion battery), gas is produced inside the battery during repeated charge and discharge, and the battery gradually expands. In this respect, the part where the battery is mounted has to be designed in consideration of expansion of the battery. Therefore, it is difficult to reduce the mounting space of the battery. By contrast, in the embodiment of the present invention, the structure of the part where battery 1 is mounted does not have to be changed. In addition, a cost increase can be prevented.

Figure 4:
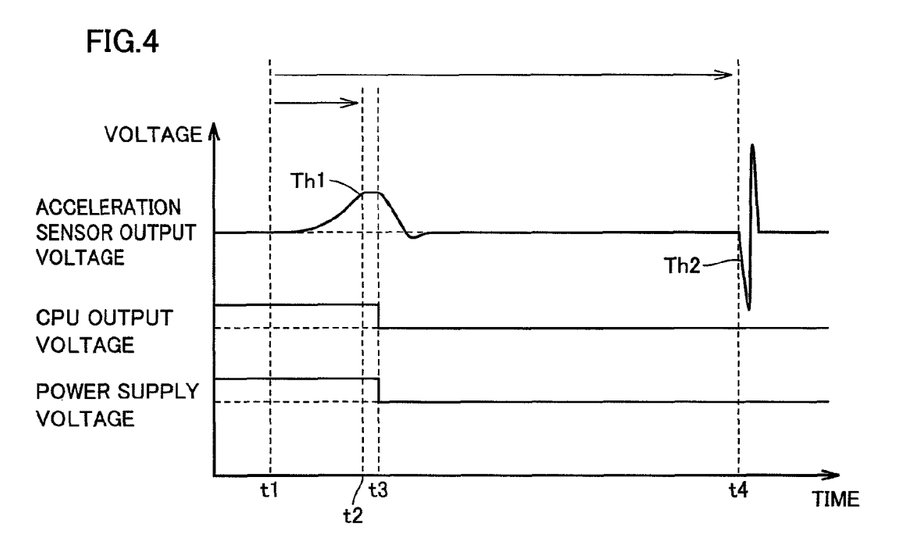
FIG. 4 is a time chart for illustrating a power supply cut-off process in accordance with the embodiment of the invention.

FIG. 4 is a time chart for illustrating a power supply cut-off process in accordance with the embodiment of the present invention. Referring to FIG. 4, a period from time t1 to time t2 shows the state immediately after portable electronic equipment 100 drops. A period from time t1 to t4 is a dropping time of portable electronic equipment 100 (the time from the start of dropping to collision with the floor, etc.).

At time t1, portable electronic equipment 100 starts dropping. Due to dropping of portable electronic equipment 100, a downward acceleration (that is, acceleration of gravity) is exerted on portable electronic equipment 100. Therefore, voltage is output from acceleration sensor 15.

In the waveform diagram in FIG. 4, when acceleration sensor 15 detects a downward acceleration, acceleration sensor 15 outputs voltage in the positive direction. Conversely, when acceleration sensor 15 detects an upward acceleration, acceleration sensor 15 outputs voltage in the negative direction. However, the relation between the direction of acceleration detected by acceleration sensor 15 and the sign of voltage output by acceleration sensor 15 may be opposite to the above-noted relation.

CPU 10 obtains the detected value (voltage value) from acceleration sensor 15 at a prescribed operation cycle (for example, every few milliseconds) and compares the value with the first threshold value. At time t2, the value of output voltage of acceleration sensor 15 exceeds a threshold value Th1. For a prescribed period from time t2 to time t3, the value of output voltage of acceleration sensor 15 is kept higher than threshold value Th1. Threshold value Th1 is set to an appropriate value, for example, based on a drop test, so that vibration produced when the portable electronic equipment is carried is not erroneously detected as dropping.

At time t3, CPU 10 changes the voltage level of the control signal (the level of the output voltage) from H level to L level. Accordingly, N-channel MOS transistor 64 and P-channel MOS transistor 66 both turn on, so that power supply to the unit is stopped.

While portable electronic equipment 100 is free falling, there occurs a period of time during which a dropping speed is constant. Therefore, for the period from time t3 to time t4, the acceleration detected by acceleration sensor 15 decreases and finally reaches zero. Therefore, for the period from time t3 to time t4, the output voltage from acceleration sensor 15 also decreases and finally reaches zero.

At time t4, portable electronic equipment 100 collides with the floor (or the ground). As a result, an upward large acceleration is instantaneously exerted on portable electronic equipment 100, and then a downward large acceleration is instantaneously exerted. Thus, acceleration sensor 15 detects the end of falling of portable electronic equipment 100.

When portable electronic equipment 100 collides with the floor (or the ground), the absolute value of the output voltage (a negative voltage) from acceleration sensor 15 becomes greater than the absolute value of threshold value Th2 (a negative value). At this point of time, CPU 10 starts counting time. After a prescribed time has elapsed since the start of counting time, CPU 10 resumes power supply to a prescribed unit. The prescribed time is not specifically limited and may be five minutes as an example.

When portable electronic equipment 100 collides with the floor (or the ground), CPU 10 may compare the value of positive output voltage from acceleration sensor 15 with a positive threshold value. In this case, CPU 10 starts counting time when the value of output voltage from acceleration sensor 15 exceeds that threshold value.

Figure 5:
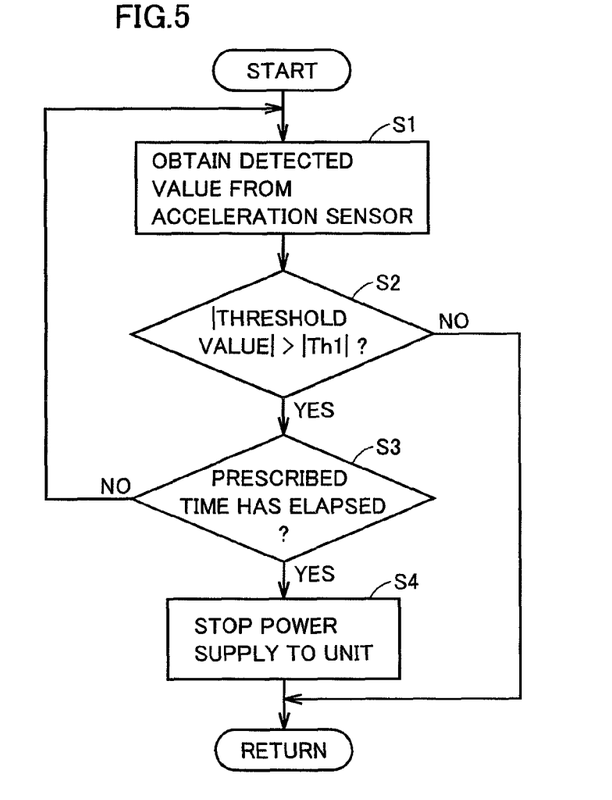
FIG. 5 is a flowchart illustrating the cut-off process executed by CPU when the portable electronic equipment drops.

FIG. 5 is a flowchart illustrating the cut-off process executed by CPU when the portable electronic equipment drops. The process shown in this flowchart is invoked from the main routine and executed, for example, every certain cycle.

Referring to FIG. 5, upon the start of the process, in step S1, CPU 10 obtains the detected value from acceleration sensor 15. Specifically, CPU 10 (acceleration detection unit 52) performs analog-to-digital conversion of the output voltage from acceleration sensor 15 to obtain the value of output voltage from acceleration sensor 15 as a detected value.

In step S2, CPU 10 (comparison unit 53) determines whether the absolute value of the detected value from acceleration sensor 15 is greater than the absolute value of threshold value Th1. In FIG. 5, "|" shows the absolute value sign (the same applies to the figures described below). Some kinds of acceleration sensor may output a negative voltage when portable electronic equipment 100 drops. Therefore, the absolute value of the detected value is compared with the absolute value of threshold value Th1. As described above, threshold value Th1 is stored beforehand in threshold storage unit 51.

If the absolute value of the detected value from acceleration sensor 15 is greater than the absolute value of threshold value Th1 (YES in step S2), the process proceeds to step S3. If not (NO in step S2), the process returns to the main routine.

In step S3, CPU 10 determines whether a prescribed time has elapsed since the absolute value of the detected value from acceleration sensor 15 becomes greater than the absolute value of threshold value Th1. The prescribed time corresponds to the period from time t2 to time t3 shown in FIG. 4. The prescribed time is determined, for example, based on the experimental result, and is, for example, a few tens of milliseconds.

Specifically, in step S3, timer 55 starts counting time in response to the comparison result from comparison unit 53 (the result that the absolute value of the detected value from acceleration sensor 15 is greater than the absolute value of threshold value Th1). When the absolute value of the detected value from acceleration sensor 15 becomes smaller than the absolute value of threshold value Th1, timer 55 stops counting time. Control signal generation unit 54 determines whether a prescribed time has elapsed, based on the counted value from timer 55.

If a prescribed time has elapsed (YES in step S3), the process proceeds to step S4. On the other hand, if a prescribed time has not yet elapsed (NO in step S3), the process returns to step S1. Steps S1-S3 are the steps of determining whether dropping of portable electronic equipment 100 is detected, based on the detected value from acceleration sensor 15.

In step S4, CPU 10 stops power supply to a prescribed unit. Specifically, control signal generation unit 54 sends a signal at an L level to switching unit 60. In response to the signal from control signal generation unit 54, switching unit 60 cuts off electrical connection between a prescribed unit and battery 1. When the process in step S4 ends, the entire process returns to the main routine.

Figure 6:
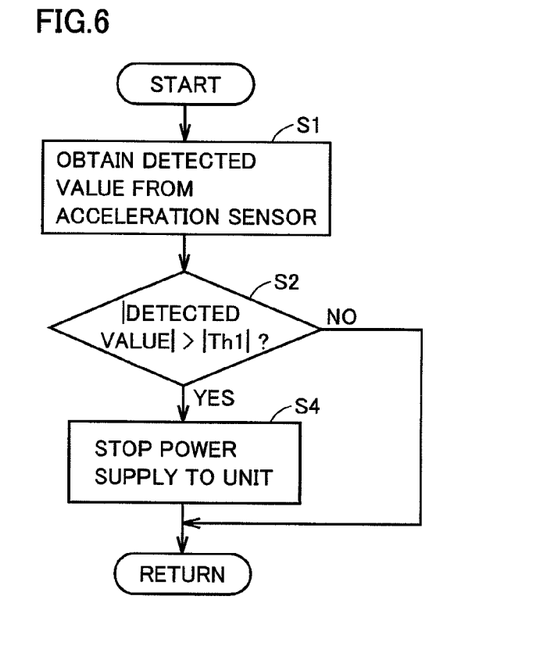
FIG. 6 is a flowchart showing a modification of the flowchart shown in FIG. 5.

FIG. 6 is a flowchart showing a modification of the flowchart shown in FIG. 5. Referring to FIG. 5 and FIG. 6, in this modification, the process in step S3 in the flowchart shown in FIG. 5 is omitted. More specifically, if the absolute value of the detected value from acceleration sensor 15 is greater than the absolute value of threshold value Th1 (YES in step S2), CPU 10 stops power supply to a prescribed unit (step S4). It is noted that the process in the other steps in the flowchart in FIG. 6 is similar to the process in the corresponding steps in the flowchart in FIG. 5.

In accordance with the process in the flowchart in FIG. 5, dropping of portable electronic equipment 100 is detected based on that the absolute value of the detected value from acceleration sensor 15 is greater than the absolute value of threshold value Th1 and such a state continues for a prescribed period. By contrast, in accordance with the process in the flowchart in FIG. 6, dropping of portable electronic equipment 100 is detected based on that the absolute value of the detected value from acceleration sensor 15 is greater than the absolute value of threshold value Th1. The execution of the process in the flowchart in FIG. 5 allows accurate detection of dropping of portable electronic equipment 100. On the other hand, the execution of the process in the flowchart in FIG. 6 can simplify the process for detecting dropping of portable electronic equipment 100.

Figure 7:
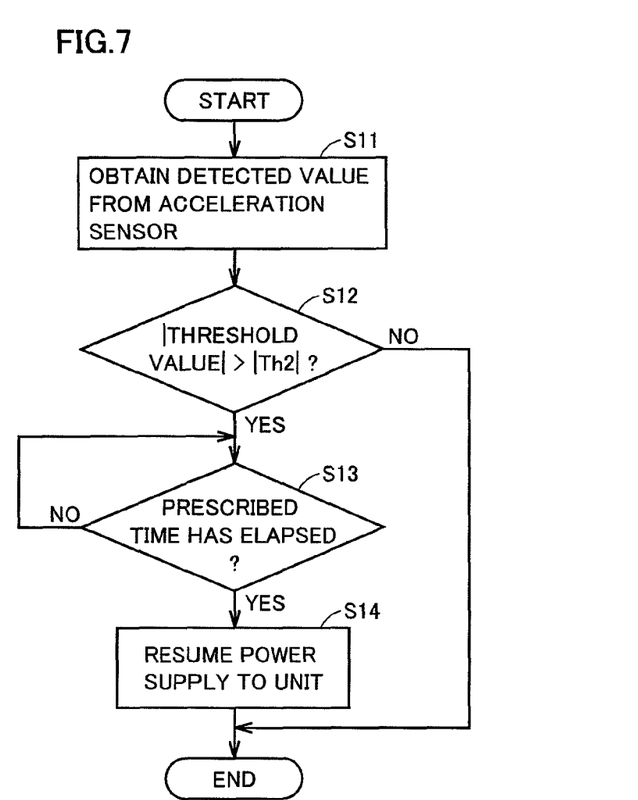
FIG. 7 is a flowchart illustrating a recovery process executed by CPU after the portable electronic equipment drops.

FIG. 7 is a flowchart illustrating a recovery process executed by CPU after the portable electronic equipment drops. The process shown in this flowchart is invoked from the main routine and executed after power supply to a prescribed unit is stopped.

Referring to FIG. 7, upon the start of the process, in step S11, CPU 10 obtains the detected value from acceleration sensor 15. In step S12, CPU 10 (comparison unit 53) determines whether the absolute value of the detected value from acceleration sensor 15 is greater than the absolute value of threshold value Th2. Because of the impact that portable electronic equipment 100 receives from the floor, ground, etc., the absolute value of the detected value from acceleration sensor 15 becomes greater than the absolute value of threshold value Th2. Both of the absolute value of the detected value from acceleration sensor 15 at this moment and threshold value Th2 are negative values (see FIG. 4). However, they may be positive values.

In step S13, CPU 10 determines whether a prescribed time has elapsed since the absolute value of the detected value from acceleration sensor 15 becomes greater than the absolute value of threshold value Th2. Specifically, in step S13, timer 55 starts counting time in response to the comparison result from comparison unit 53 (the result that the absolute value of the detected value from acceleration sensor 15 is greater than the absolute value of threshold value Th2). Control signal generation unit 54 determines whether a prescribed time has elapsed, based on the counted value from timer 55. It is noted that threshold value Th2 is stored together with threshold value Th1 in threshold storage unit 51.

If a prescribed time has elapsed (YES in step S13), the process proceeds to step S14. On the other hand, if a prescribed time has not yet elapsed (NO in step S13), the process returns to step S13. In other words, the process in step S13 is repeatedly executed until it is determined that a prescribed time has elapsed.

In step S14, CPU 10 resumes power supply to a prescribed unit. Specifically, control signal generation unit 54 sends a signal at an H level to switching unit 60. In response to the signal from control signal generation unit 54, switching unit 60 electrically connects a prescribed unit with battery 1. When the process in step S14 ends, the entire process returns to the main routine.

The terminal of the battery may be disengaged from the connector because of the impact that portable electronic equipment 100 receives from the floor or the ground. In this case, instantaneous voltage drop may occur. Therefore, as shown in FIG. 5 and FIG. 6, CPU 10 stops power supply to a prescribed unit.

As shown in FIG. 3, even when power supply to the unit is cut off, the power supply voltage may slightly drop due to the impact that portable electronic equipment 100 receives when dropping, and thereafter the power supply voltage may recover. In accordance with the process in the flowchart in FIG. 7, a prescribed time used in the determination process in step S13 is set as appropriate, so that power supply to a prescribed unit can be resumed after the power supply voltage recovers to the original voltage. The battery terminal is in secure contact with the connector when the power supply voltage recovers to the original voltage. Therefore, the operation of CPU 10 can be maintained, and in addition, power can be supplied from the battery to each unit.

It is noted that the recovery process is not limited to the process in the flowchart in FIG. 7 and the process in the flowchart in FIG. 7 is susceptible of various modifications. Another example of the recovery process executable by CPU will be described below.

Figure 8:
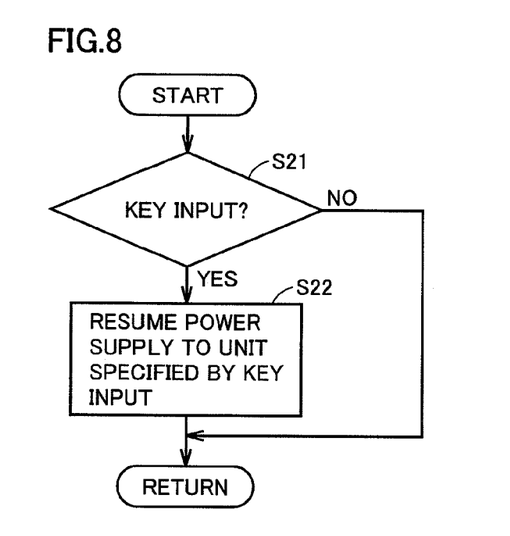
FIG. 8 is a flowchart illustrating another example of the recovery process executable by CPU.

FIG. 8 is a flowchart illustrating another example of the recovery process executable by CPU. Referring to FIG. 8, upon the start of the process, in step S21, CPU 10 determines whether a key input for recovering any particular unit is received from key unit 14. If a key input is received (YES in step S21), the process proceeds to step S22. On the other hand, if no key input is received (NO in step S21), the process returns to the main routine.

In step S22, CPU 10 resumes power supply to a unit specified by the key input. More specifically, CPU 10 controls the switching unit provided for the functional unit specified by the user, thereby resuming power supply to that functional unit. When the process in step S22 ends, the entire process returns to the main routine.

Figure 9:
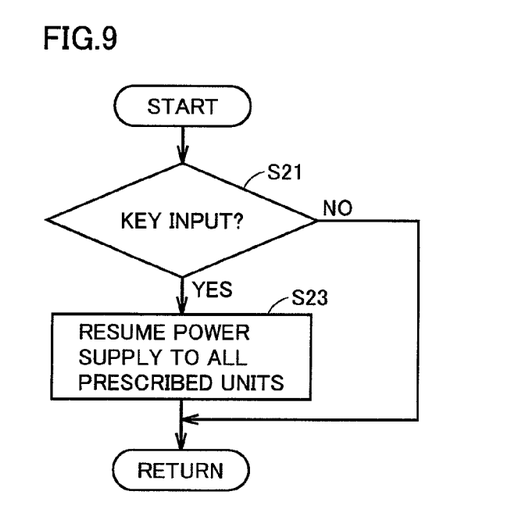
FIG. 9 is a flowchart illustrating yet another example of the recovery process executable by CPU.

FIG. 9 is a flowchart illustrating yet another example of the recovery process executable by CPU. Referring to FIG. 9, upon the start of the process, in step S21, CPU 10 determines whether a key input is received from key unit 14. If a key input is received (YES in step S21), the process proceeds to step S23. On the other hand, if no key input is received (NO in step S21), the process returns to the main routine.

In step S23, CPU 10 resumes power supply to all of prescribed units. More specifically, CPU 10 controls the switching unit provided for each functional unit, thereby resuming power supply to that unit. When the process in step S23 ends, the entire process returns to the main routine.

In the flowchart shown in FIG. 7, steps S12 and S13 are the steps of determining whether a prescribed recovery condition is satisfied. On the other hand, in the flowcharts shown in FIG. 8 and FIG. 9, step S21 is the step of determining whether a prescribed recovery condition is satisfied.

The execution of the process in the flowchart shown in FIG. 7 allows portable electronic equipment 100 to recover to the state before the dropping, after portable electronic equipment 100 lands on the floor or the ground. On the other hand, in accordance with the flowchart shown in FIG. 8, the load is increased step by step at the time of recovery of portable electronic equipment 100, so that a significant drop of power supply voltage can also be prevented when power supply by battery 1 gradually recovers.

As an example in which power supply by battery 1 gradually recovers, tapping of an alkaline battery is considered.

Figure 10:
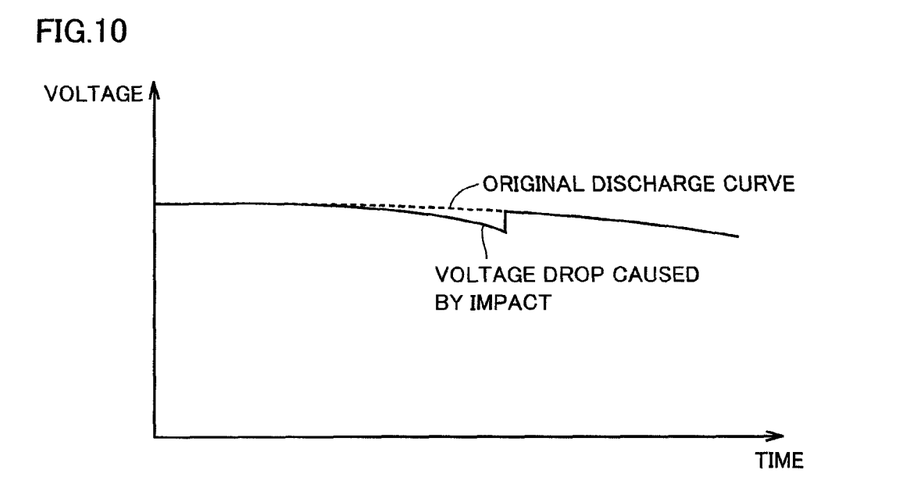
FIG. 10 is a graph illustrating tapping of an alkaline battery.

FIG. 10 is a graph for illustrating tapping of an alkaline battery. Referring to FIG. 10, in a case where an alkaline battery is used as battery 1 of portable electronic equipment 100, the impact from dropping may result in a phenomenon called tapping, in addition to instantaneous voltage drop caused by disengagement of the battery terminal from the connector as described above.

It is known that when an alkaline battery is subjected to impact or vibration, the terminal voltage fluctuates at that moment. It is thought that this is because impact or vibration causes displacement between particulate zinc included in a gel-like negative electrode material or displacement between a gel-like negative electrode material and a negative electrode collector rod. This phenomenon is called tapping.

If power supply to a plurality of units is resumed simultaneously in spite of a voltage drop caused by tapping, power supply voltage may further drop significantly. In accordance with the flowchart in FIG. 8, only the unit specified by the key input becomes operative. Therefore, in accordance with the flowchart in FIG. 8, a significant drop of power supply voltage at a time of recovery can be prevented in the case where an alkaline battery is used.

On the other hand, in accordance with the flowchart in FIG. 9, power supply to each unit can be resumed with a single operation by the user, so that the user's operation can be simplified as compared with the process in the flowchart in FIG. 8.

As described above, in accordance with the embodiment of the present invention, when dropping of portable electronic equipment is detected, power supply to a prescribed unit among a plurality of units is cut off. Accordingly, power supply to a high-load device is stopped, and the operation of CPU 10 is thus maintained. Therefore, in accordance with the embodiment of the present invention, the operation of portable electronic equipment 100 can be maintained. Since the operation of portable electronic equipment 100 is maintained, portable electronic equipment 100 can be protected from instantaneous voltage failure caused by impact from dropping.

It is noted that the processes in the flowcharts in FIG. 7 and FIG. 8 may be combined. More specifically, CPU 10 may resume power supply to a unit specified by a key input until a prescribed time has elapsed, and may resume power supply to all the units simultaneously after the prescribed time has elapsed.

Any of the flowcharts shown in FIG. 7, FIG. 8, and FIG. 9 may be selectively executed. In this case, information as to which of the processes of the flowcharts shown in FIG. 7, FIG. 8, and FIG. 9 is executed is written from CPU 10 into flash ROM 11 through a user's operation. CPU 10 reads out the information from flash ROM 11 when starting up, thereby selectively executing any of the flowcharts shown in FIG. 7, FIG. 8, and FIG. 9.

Furthermore, in accordance with the flowcharts in FIG. 5-FIG. 7, CPU 10 obtains the detected value from acceleration sensor 15 at a prescribed cycle and compares the detected value with the threshold value. Dropping of portable electronic equipment is thus detected. However, acceleration sensor 15 itself may compare the value of acceleration with the threshold value and, if the acceleration exceeds the threshold value, may output an interrupt signal to CPU 10. In this case, CPU 10 stops power supply to a prescribed unit by controlling switching unit 60 in response to interruption of the signal. Also in this case, when acceleration sensor 15 detects dropping of portable electronic equipment, power supply to a prescribed unit can be stopped. Therefore, the present invention may also include such the above-noted structure.

In the foregoing embodiment, professional-use portable electronic equipment is shown as portable electronic equipment 100. However, the present invention is applicable to portable electronic equipment driven by a battery and including a detection unit (for example, acceleration sensor) for detecting dropping of the equipment. Therefore, the present invention is also applicable to, for example, portable electronic game machines, mobile phones, and the like.

Although the present invention has been described and illustrated in detail, it is clearly understood that the same is by way of illustration and example only and is not to be taken by way of limitation, the scope of the present invention being interpreted by the terms of the appended claims.

What is claimed is:

1. Portable electronic equipment driven by a battery, comprising:
a power supply circuit connected to said battery;
a plurality of functional units operating with power supplied from said battery through said power supply circuit;
a control unit for controlling said plurality of functional units with power supplied from said battery through said power supply circuit;
a detection unit for detecting dropping of said portable electronic equipment; and a
switching unit provided for at least one unit that does not require constant power feed, among said plurality of functional units, for switching whether to electrically connect said at least one unit to said battery,
wherein when dropping of said portable electronic equipment is detected by said detection unit, said switching unit cuts off electrical connection between said at least one unit and said battery such that power necessary for continuous operation of the portable electronic equipment can be obtained from the power supply circuit other than the battery,
after electrical connection between said at least one unit and said battery is cut off, said switching unit recovers electrical connection between said at least one unit and said battery when a prescribed recovery condition is satisfied,
said detection unit is configured to detect an end of dropping of said portable electronic equipment, and
said prescribed recovery condition is a condition that a prescribed time has elapsed since an end of dropping of said portable electronic equipment is detected by said detection unit.

2. The portable electronic equipment according to claim 1, wherein said plurality of functional units include a volatile memory for storing data for an operation of said control unit, and
said at least one unit is included in units of said plurality of functional units
excluding said volatile memory.

3. The portable electronic equipment according to claim 1, wherein said control unit controls said switching unit based on an output from said detection unit.

4. The portable electronic equipment according to claim 3, wherein
said detection unit outputs a value corresponding to an acceleration exerted on said portable electronic equipment,
said control unit includes
a storage unit for storing first and second threshold values to be compared with an output value from said detection unit,
a counting unit for starting counting time from a time when an absolute value of an output value from said detection unit exceeds an absolute value of said second threshold value, and
a switching control unit for controlling said switching unit, an absolute value of said second threshold value is greater than an absolute value of said first threshold value, and
if an absolute value of an output value from said detection unit is greater than an absolute value of said first threshold value and is smaller than an absolute value of said second threshold value, said switching control unit controls said switching unit such that electrical connection between said at least one unit and said battery is cut off, and then, when a counted time from said counting unit reaches said prescribed time, said switching control unit recovers electrical connection between said at least one unit and said battery.

5. The portable electronic equipment according to claim 1, further comprising an input unit for accepting an instruction by a user,
wherein said prescribed recovery condition is a condition that an instruction to resume an operation of said at least one unit is input to said input unit.

6. The portable electronic equipment according to claim 1, wherein said at least one unit includes a bar code reader, a buzzer/speaker unit, a camera, an SD/CF connector, a vibrator, a Bluetooth module, a wireless LAN module and an indicator LED.

7. The portable electronic equipment according to claim 1, wherein said at least one unit is a unit that is not necessary for a continuous operation of said portable electronic equipment.

8. The portable electronic equipment according to claim 1, wherein said power supply circuit includes a capacitor that prevents fluctuations in power supply voltage during operation of the portable electronic equipment and can supply power necessary for continuous operation when the portable electronic equipment is detected as being dropped.

9. A method of controlling portable electronic equipment driven by a battery, said portable electronic equipment including a power supply circuit connected to said battery, a plurality of functional units operating with power supplied from said battery through said power supply circuit, a control unit for controlling said plurality of functional units with power supplied from said battery through said power supply circuit, a detection unit for detecting dropping of said portable electronic equipment, and a switching unit provided for at least one unit that does not require constant power feed, among said plurality of functional units, for switching whether to electrically connect said at least one unit to said battery, said method comprising the steps of:

determining whether dropping of said portable electronic equipment is detected, based on an output value from said detection unit;

cutting off electrical connection between said at least one unit and said battery, using said switching unit, when it is determined that dropping of said portable electronic equipment is detected, such that power necessary for continuous operation of the portable electronic equipment can be obtained from the power supply circuit other than the battery;

determining whether a prescribed recovery condition is satisfied; and recovering electrical connection between said at least one unit and said battery, using said switching unit, if it is determined that said prescribed recovery condition is satisfied, wherein said detection unit is configured to detect an end of dropping of said portable electronic equipment, and said prescribed recovery condition is a condition that a prescribed time has elapsed since an end of dropping of said portable electronic equipment is detected by said detection unit.

10. The method according to claim 9, wherein said plurality of functional units include a volatile memory for storing data for an operation of said control unit, and said at least one unit is included in units of said plurality of functional units excluding said volatile memory.

11. The method according claim 9, wherein said detection unit outputs a value corresponding to an acceleration exerted on said portable electronic equipment, said method further comprising the steps of:

preparing first and second threshold values to be compared with an output value from said detection unit; and counting time from a time when an absolute value of an output value from said detection unit exceeds an absolute value of said second threshold value, wherein an absolute value of said second threshold value is greater than an absolute value of said first threshold value, said step of cutting off includes the step of controlling said switching unit such that electrical connection between said at least one unit and said battery is cut off, if an absolute value of an output value from said detection unit is greater than an absolute value of said first threshold value and is smaller than an absolute value of said second threshold value, and said step of recovering includes the step of recovering electrical connection between said at least one unit and said battery, when a time counted by the step of counting reaches said prescribed time.

12. The method according to claim 9, wherein said portable electronic equipment further includes an input unit for accepting an instruction by a user, and said prescribed recovery condition is a condition that an instruction to resume an operation of said at least one unit is input to said input unit.

13. The method according to claim 9, wherein said at least one unit includes a bar code reader, a buzzer/speaker unit, a camera, an SD/CF connector, a vibrator, a Bluetooth module, a wireless LAN module and an indicator LED.

14. The method according to claim 9, wherein said at least one unit is a unit that is not necessary for a continuous operation of said portable electronic equipment.

* * * * *